Feb. 8, 1938. W. A. DARRAH 2,108,030
PROCESS OF OXIDATION
Filed April 30, 1934
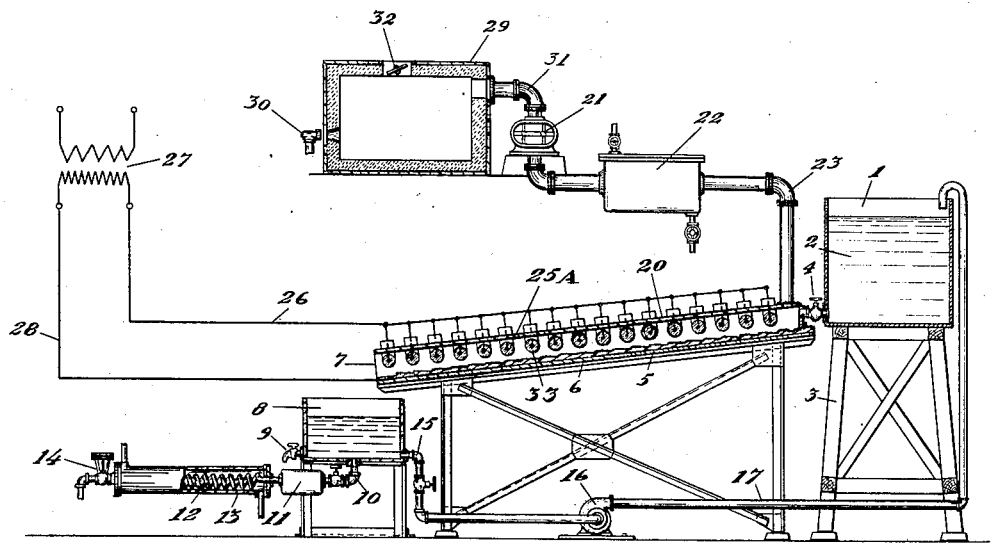
Fig.1.
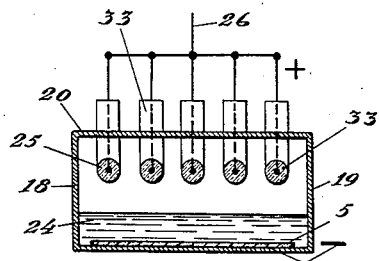
Fig.2.
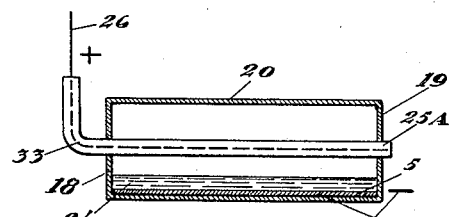
Fig.3.
Fig.4.
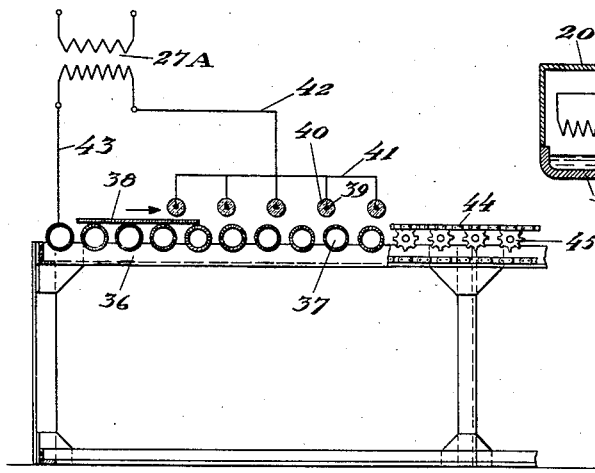
Fig.5.
William A. Darrah.
Inventor.

Patented Feb. 8, 1938

2,108,030

UNITED STATES PATENT OFFICE 2,108,030

PROCESS OF OXIDATION

William A. Darrah, Chicago, Ill.

Application April 30, 1934, Serial No. 723,172

7 Claims. (Cl. 204—26)

This invention relates to apparatus and methods for causing oxidations and similar reactions. It has for its object the carrying out of such reactions at a highly accelerated rate accomplishing in a short period, what would under normal conditions, require many months or years. My invention accomplishes the desired results at a relatively low cost, substantially automatically and permits of relatively accurate control.

The applications of my invention are apparent in quite wide-spread fields, but the mechanism of obtaining these results, the process employed and the apparatus required are closely related and quite similar.

One application of my invention is the purification of milk by a substantial reduction in the bacteria count and the creation of an oxidizing position. Another application of my invention is the treatment of water to make it suitable for human consumption by reducing the biological oxygen demand, reducing the bacteriological count and precipitating suspended bodies such as bacteriological growths, etc.

My invention may also be applied in the laundrying industry to the bleaching and whitening of clothes and the imparting to the clean clothes the attractive odor of ozone.

Another application of my invention is the treatment of sewage sludge to cause a coagulation of suspended matter greatly facilitating filtration.

Another very important manner in which my invention may be applied is the so-called aging of various beverages, particularly such alcoholic beverages as whiskey, brandy, wines and related substances. In this case I have found that by submitting various alcoholic beverages, preferably those of the higher alcoholic content to my process, the bouquet is greatly accentuated and the smoothness of the product remarkably increased.

I wish it to be understood that while it may appear that these various results are quite radically different each from the other, they are in effect actually different manifestations of similar reactions and therefore all come within the scope of my invention.

Referring to the drawing, Figure 1 shows in diagram a side elevation of one form of my invention.

Figure 2 shows the cross section of the treating portion of my invention, while

Figure 3 shows in cross section a modification thereof.

Figure 4 shows a further modification of my invention, and

Figure 5 shows a mechanical variation of my invention as applied to the treating of clothes or other solid materials, it being understood that the former figures show the application of my invention to the treatment of liquid materials.

Referring to the figures, 1, indicates a tank or storage for liquid material, 2, to be treated by my process. The tank is shown for purposes of illustration, supported at an elevated level by frame 3, so that the flow may be by gravity through control valve 4. The liquid 2, flowing out of valve 4, passes onto an inclined plate 5, which to advantage may be formed with a serrated bottom, 6, although if desired I may use a plane or smooth bottom. At the discharge end 7, of inclined plate 5, I provide a receptacle 8, to receive and hold the treated liquid. It should be understood that while 5, shows an inclined plate adapted to treat materials continuously, I may if desired arrange 5 to be substantially horizontal and treat the liquid in batches.

Receptacle 8, is connected with draw off valve 9, for delivering the treated liquid to a succeeding step in the process or to storage or distribution. Receptacle 8, is also provided with a draw off outlet 10 which passes the treated liquid through a filter 11, then through a heating chamber 12, which may be treated with a steam jacket 13 and finally to an outlet equipped with control valve 14. Receptacle 8, is also provided with an additional outlet 15, leading to the intake of liquid moving device 16 such as a pump which delivers the liquid through conduit 17, back into container 1 for a second treatment in case this should be desirable. It will be apparent that by closing valves 9 and 10 and opening outlet 15, I can continuously treat any given quantity of material thus carrying the reactions incident to my process on to any desired degree.

Plate 5 is provided with side walls 18 and 19 and a cover or closure 20, so that the liquid passing from container 1 is maintained in a closed space. I have provided a fan or gas circulating member 21, arranged to deliver air or other gases through a washer and conditioner 22 and duct 23 into the closure formed by plate 5 and cover 20.

I then provide within said enclosure means for producing a strong electric field, preferably one changing in direction and intensity at very frequent intervals. One convenient manner of accomplishing this result is to provide just above the layer of liquid 24, a series of electrical conductors 25A, each of which are connected to a terminal 26, which in turn makes contact with a high tension terminal of a source of high voltage current such as transformer 27. Obviously induction coils or other sources of high voltages may be employed to equal advantage. The other terminal 28, of transformer 27, or the equivalent device is connected to plate 5, thus making contact with the liquid passing thereover. It should be understood that my device will operate whether or not the liquid passing over plate 5 is a conductor, as by applying a sufficiently high voltage a strong electric field is readily produced between the series of conductors 25A and plate 5.

In some cases, I prefer to deliver to a fan or blower 21, a mixture of other materials than air as for example, I may employ the device shown consisting of a combustion chamber 29 supplied with fuel from a burner device 30 and connected to the intake of fan 21, by means of duct 31. This device is also provided with a damper member 32 to permit the addition of controlled amounts of free air to the products of combustion. In Figure 3, the insulated members connected to conductor 26, are arranged transversely of plate 5 and housing 20, while in Figure 2, the conductors 25 are arranged longitudinally of the plate 5. In both cases, I have shown a covering 33 surrounding the conductor I preferably formed of insulating material. The object of this is to prevent a direct discharge in the form of an arc or large flow of current between the conductor 25 or 25A and plate 5.

In some cases the construction shown in Figure 4 has advantages. In this case the plate 5 covered by enclosure 20, forms a box or duct housing a series of conducting members 34 which preferably terminate in a series of sharp points or edges directed toward plate 5, thus causing a large brushed discharge between 34 and plate 5. As in the case of similar arrangements the terminals of a transformer or other source of high tension 27, are connected to conducting member 34 and plate 5. I may to advantage provide condenser 35 in series with this circuit to prevent an arc or other discharge of high amperage.

It may be understood that the objects of my invention are most successfully accomplished when the discharge takes a form similar to that commonly known as a corona discharge in distinction to a direct spark or arc. Perhaps the outstanding distinction in the type of discharge may be brought out when it is stated that in my device the flow of electricity permits the maintenance of a very high potential difference between the two terminals, as for example between conductor 25 and plate 5, or conductor 34 and plate 5. On the other hand, in case of an arc or spark, the potential difference between the terminals momentarily drops to values of a very few volts instead of continuously maintaining many hundreds or many thousands of volts.

In carrying out my process for the aging of alcoholic beverages, I have found that in many cases this appears to be a complicated reaction, but the predominant features are a partial oxidation of some of the components of the beverage and a subsequent combination of these oxidation products with a portion of the uncombined material.

For example, considering the alcoholic content which it should be understood includes not only ethyl alcohols, but some of the higher alcohols the controlled oxidation of these products produces among other things acids and aldehydes. The combination of the acids with some of the alcohols present produces esters with the resultant development of a marked bouquet.

By passing beverages containing large amounts of alcohol through my apparatus, a definite increase in acid content and aldehyde content is noted. Also a definite increase in the ester content may be observed but not in quite as high a ratio as in the case of acids and aldehydes. However, by subjecting the beverage after preliminary treatment in the oxidation device to a subsequent period of heating, as for example, in a pressure cooker it is possible to control the percentage of esters formed within very defined limits. It should be understood that beverages containing large amounts of protein or starches are subject to additional changes which may affect the flavor and smoothness, but in the simplest case those beverages which consist largely of water and alcohol give the simplest and most readily traceable reactions.

For example by passing an American whiskey made from grain through my apparatus and subjecting it to the subsequent period of heat and pressure, the changes noted have been found to be somewhat as listed in the table below:

| Material | Alcohol (percent) | Parts per 100,000 | | | |
|---|---|---|---|---|---|
| | | Total acid | Esters | Higher alcohols | Aldehydes |
| New grain whiskey | 61 | 6 | 31 | 56 | 6 |
| Treated grain whiskey | 49 | 25 | 42 | 64 | 11 |

In the case of a beverage produced from potatoes, the initial and final characteristics are given in the table below

| Material | Alchol (percent) | Parts per 100,000 | | | |
|---|---|---|---|---|---|
| | | Total acid | Esters | Higher alcohols | Aldehydes |
| New potato whiskey | 70 | 8 | 33 | 141 | 13 |
| Treated potato whiskey | 58 | 28 | 37 | 182 | 67 |

The above data is submitted as merely typical of the changes taking place and it should be understood that these may be controlled so as to cause greater or less changes, depending on the temperatures, pressures, time, treating conditions and other factors. Obviously recirculating the liquid several times through the treating apparatus will increase the oxidation and, therefore, the percentage of total acids and aldehydes. The subsequent heating and pressure treatment will accentuate the percentage of esters. I have found that most of these reactions are of the reversible type in which the dissociation of the compounds formed has a tendency to take place after relatively high concentrations occur. For most practical apparatus, however, the rate of dissociation is quite slow in view of the low percentage of the compounds produced.

In the case of the treatment of clothes for bleaching and sweetening, the apparatus shown in diagram in Figure 5, is applicable. This consists of a frame 36 carrying a series of live rolls or similar equipment 37, which may be driven by a series of chains 44 and sprockets 45 or other obvious means. Frame 36 and roller 37, therefore, form a moving support or bed for the material being treated. I may apply a moving belt of canvas, rubber or similar material as desired, although for many purposes this is not necessary. The materials to be treated are placed on the roller bed, as indicated by 38 and travel along in the direction shown by the arrows passing under the series of conductors 39 which are surrounded by a housing and connected by lead 41 to terminals 42 and 43 of transformer 27A. The passage terminal 43 of transfer 27A is connected to the metallic frame 36 so that the material travelling on rollers 37 is passed during travel through a strong corona discharge which causes the bleaching and general oxidation as set forth.

In the case, it is desirable to keep the air surrounding the articles being treated relatively dry to reduce the percentage of oxides of nitrogen to as low a figure as possible. Under practical conditions, I have found that no difficulty results when the clothes to be treated are allowed to possess a slight normal alkalinity, to counteract the effect of the oxides of nitrogen which may collect. It is desirable that the material being treated should be slightly moist, although under normal conditions the ordinary so-called water of condition is sufficient to accomplish this purpose. That is to say, if the moisture content runs from 4–10% satisfactory results may be obtained. Dried materials are objectionable and extremely wet materials are somewhat difficult to handle, but give satisfactory results.

When possible, the material being treated should be exposed in a single thin layer in order to permit treatment of as great a percentage of the material as possible. Since the action appears to be between the surrounding air and the article being treated obviously the greater the surface exposed to air the more complete the results.

I have observed the rather curious effect that when the discharge appears somewhat purplish or at least having a definite reddish tinge a greater percentage of oxides of nitrogen is produced than when the discharge has a pale bluish or whitish tinge. In the latter case it appears that the discharge is most active in condensing oxygen on the materials being treated and, therefore, inducing the results of oxidation.

It will be apparent that many modifications may be made in the apparatus and process here disclosed without departing from the scope of my invention. I may employ either a direct current or alternating current for the high potential discharge. Because of its simplicity a 60-cycle, alternating current is very convenient for many purposes, but the effects obtained may be considerably increased by using higher frequencies particularly those in whose polarity changes many thousands or even hundreds of thousands times per second. That is to say, the normal high frequency circuits are quite advantageous for this work. I note, however, that the percentage of oxides of nitrogen appears to increase when high frequency circuits are used as contrasted to those in the case of direct current. In case direct current is employed, I prefer to make the material which is to be subjected to oxidation the negative terminal.

I have found that in many cases the effect of temperature is quite marked in increasing the rate of oxidation and, therefore, the effectiveness of this equipment. Many substances are limited as to satisfactory operating temperature by incidental factors. For example, many beverages must be kept below certain temperature limits to prevent excessive vaporization of some of the constituents thereof. In the case of treating milk to kill bacteria, higher temperatures up to 80 or 90° F. appear to be helpful.

However, in some cases reduced temperatures assist in the absorption of oxygen. This is particularly true in the case of the treatment of clothes with the apparatus outlined in Figure 5. In general, therefore, I have determined that a control of the temperature within certain limits is helpful in obtaining the maximum results, but these limits vary in the case of nearly all materials treated.

It should be understood that where I refer to oxidation and methods therefor, in connection with the specific process, I do not wish to be limited solely to the method of oxidation disclosed although I consider that one of the most flexible and easily applied of the many which are available. Obviously, where oxidation is required as for example, in the case discussed of the formations of acids and aldehydes from alcohols in beverages I may use other methods of obtaining this oxidation. For example I may bring the material to be oxidized in contact with one pole of an electric battery or source of direct current, the other pole being separate from the liquid by means of a porous partition or diaphragm. Under these conditions when current is passed in the proper direction oxygen will be liberated from the terminal in contact with the liquid being oxidized and the desired results will be obtained. It is also possible to pass the material over various oxygen containing catalysts or oxygen containing compounds, but I prefer one of the electrical methods as avoiding the introduction of other materials. After oxidation has been accomplished by any of the methods set forth, the subsequent heat and pressure treatment to cause a reaction between a portion of the free acid and the portion of the alcohol forming esters, will then complete the so-called aging or seasoning process. As set forth in this description, I may add not merely oxygen but also carbon dioxide to the material being treated. This appears to further improve the characteristics of alcoholic beverages subjected to my process, as I do not, however, wish to be restricted exclusively to carbon dioxide with oxygen as oxygen alone will accomplish the results which I have set forth.

It appears that the process and apparatus which I have invented serves to activate the oxygen in the adjacent gas or the liquid being treated, causing in short periods, a degree of oxidation which would otherwise take many days. In the case of liquids containing large amounts of water with only small quantities of oxidizable materials, the water appears to absorb or dissolve oxygen in active form.

I wish it to be understood that the reactions I have mentioned are merely typical illustrations as innumerable other substances may be oxidized and other compounds formed by varying the temperature of gas and liquid, pressure of gas, time of treatment, voltage applied and raw materials treated. Thus linseed oil may be oxidized and bleached, which, it will be noted, is exactly contrary to usual practice in which the process of "boiling" and oxidation always darkens the oil.

As outlined above when it is desired to add oxygen to a material greater efficiency appears to be obtained when the material to be oxidized is made the negative terminal. As a theory which may account for the facts I have observed, I would advance that it has been demonstrated that oxygen tends to collect about carriers of negative electric charges or any substance which is negatively electrified. As between oxygen and nitrogen, which of course form the bulk of the air, oxygen is strongly attracted to negative surfaces while nitrogen is apparently relatively inert. Water vapor, on the other hand, appears to be somewhat attracted by negative surfaces and of course various gases and vapors can be divided by simple tests into two classes namely, those which are attracted to negative surfaces and those which are attracted to positive surfaces. Probably some molecules are relatively inert and may be attracted to neither.

It would appear, therefore, that when the surface of a layer of liquid such as water is negatively charged in the presence of a moving stream of gas such as air, which contains a portion of oxygen, some of the oxygen molecules will be attracted and become attached to the negative surface penetrating the surface film and thereby offering optimum conditions for solution in the liquid.

My experience has indicated that the various facts and conditions which are desirable to obtain the maximum addition of oxygen to a liquid such as water involves first a negative charge on the surface of the water or liquid), second, an ample supply of gases (or air) containing the oxygen or other gaseous molecule which is attracted to a negative surface, third, for continuous operation it is desired to have a relatively rapid movement of the liquid (or water) so that after the maximum oxygen demand has been satisfied a new surface of water (or liquid) may be presented for action.

It will, of course, be apparent that it is not necessary to provide all of the conditions outlined above, but when all of the conditions above outlined are present most effective oxidation or oxygen absorption is obtained.

It will be apparent from the above discussion that the process I have invented may be utilized either as a means of actually oxidizing a substance that is to say, of actually causing the oxygen to combine with a portion of it, or on the other hand, the process may be used in obtaining an increased quantity of oxygen dissolved or physically combined with the material being treated. This is in distinction to the chemical combination mentioned above. For example, the oxygen content of water may be greatly increased by this method and very appreciable quantities of hydrogen peroxide may be obtained in the water. The increased quantity of dissolved oxygen is, of course, ordinarily considered a physical addition while the presence of hydrogen peroxide indicates a chemical condition.

The addition of small quantities of oxides of nitrogen (forming in water the various nitrogen containing acids) make the process I have outlined particularly applicable to water treatment on a large scale. The increased oxygen content, both physically and chemically combined, very appreciably decreases the bacteriological content or "purifies" the water.

Apparently the presence of small quantities of the oxides of nitrogen have a similar effect and in the case where certain algae are present there is a definite tendency for coagulation or precipitation of a portion of the organic material, thus further purifying the water.

It may be stated, therefore, that the process here outlined very materially purifies water, milk and similar materials greatly reducing hazards to health.

It will be understood from the above that the physical arrangements shown on the drawing are merely typical and disclose illustrative means of accomplishing the desired results. Obviously, many mechanical variations of the means outlined may be employed and still come fully within the scope of my invention.

In this connection, it should be specifically understood that in the case of the structure shown diagrammatically in Figure 1, when treating water, milk or similar liquids, I may wish to entirely eliminate the source of heat indicated by burner 30 and circulate merely clean air which might for example enter blower 21 through any convenient inlet and then pass in close contact with the liquid being treated.

By the term "silent electric discharge" I intend to refer to the flow of electricity through gases, which is neither a continuous arc nor a spark. The term "corona discharge" has sometimes been used to cover this condition. It differs from the spark and the arc in that both of these forms of electric flow are concentrated or localized, whereas the so-called silent discharge spreads over a large area. The discharge is not silent as it is usually accompanied by a hissing or rustling noise. It is of course so much quieter than the spark and usually quieter than the ordinary arc, that it is called the silent discharge" by way of contrast.

It is to be understood that in using the term "alcohol" in this specification and claims, I am of course referring to the term in the broad sense; that is, there may be ethyl, butyl, propyl and many other alcohols.

Having now fully described my invention, what I claim as new and wish to secure by Letters Patent in the United States, is as follows:

1. The process of oxidizing beverages containing alcohol which consists in passing a stream of the liquid beverage to be oxidized in contact with a moving stream of gas containing oxygen, causing a silent electric discharge to pass through said stream of gas containing oxygen to said liquid and continuously removing the entering stream of gas and liquid and introducing fresh quantities of gas and liquid, and subsequently subjecting said treated liquid to elevated temperatures for a sufficient time to cause a portion of said products of oxidation to react on another portion of the liquid, thus creating a beverage similar to one which has been extensively aged.

2. The process of oxidizing alcohol containing beverage which consists in passing a stream of the liquid beverage to be oxidized in contact with a moving stream of gas containing oxygen, causing a silent electric discharge to pass through said stream of gas containing oxygen to said liquid and continuously removing the entering stream of gas and liquid, introducing fresh quantities of gas and liquid and maintaining said gas at a controlled temperature, and subjecting said oxidized liquid to controlled elevated temperatures so as to combine a portion of the oxidized products with the unoxidized products.

3. The process of oxidizing a liquid containing an alcohol which consists in passing the liquid continuously in a thin film in contact with a moving stream of gas containing oxygen, causing a silent electric discharge to pass through said gas to said liquid, thus creating active oxygen in contact with said liquid film, and continuously replacing said gas and said liquid as the reaction progresses, and subsequently subjecting said liquid to elevated temperatures under conditions such as to cause a portion of said oxidized compound to form esters and related substances.

4. The process of oxidizing a liquid containing an alcohol which consists in passing a moving stream of said liquid in a thin film in contact with a moving stream of gas containing oxygen and carbon dioxide, causing a silent electric discharge to pass through said moving stream of gas to said liquid, thus generating ozone in contact with said liquid, continuously replacing the quantities of gas and liquid in positive circulation, said liquid being made the negatve terminal of the circuit causing said silent electric discharge, and subsequently subjecting said liquid to pressures and temperatures elevated above normal so as to permit said oxidized portions to react with the unoxidized portions of said liquid.

5. The process of oxidizing alcoholic beverages which consists in passing said alcoholic beverages in a continuous stream in a closed container in contact with a continuous stream of gas containing oxygen, causing a silent electric discharge to pass through said gas to said alcoholic beverage, continuously removing said treated beverage and subsequently subjecting said treated beverage to pressure and elevated temperatures for a sufficient time to cause a portion of said products of oxidation to combine with a portion of the unoxidized products of said beverage, thereby forming esters and related compounds.

6. The process of aging beverages containing an alcohol which consists in bringing said beverage into contact with a gas containing oxygen and carbon dioxide, subjecting said gas to a silent electric discharge, thereby oxidizing some of the alcohol and dissolving some carbon dioxide in said beverage and subsequently subjecting said oxidized beverage to elevated temperatures for a sufficient time to cause a portion of said products of oxidation and carbon dioxide to combine with other products within said beverage, thus modifying the flavor of the product.

7. The process of aging a beverage containing an alcohol which consists in bringing said beverage into contact with a gas containing oxygen and carbon dioxide, subjecting said gas to a silent electric discharge thereby oxidizing some of the alcohol and dissolving some of the carbon dioxide in the beverage and subsequently subjecting said treated beverage to controlled temperatures for a sufficient time to cause some of the oxidized products to combine with some of the alcohols, thus modifying the flavor.

WILLIAM A. DARRAH.